2,777,827
Patented Jan. 15, 1957

2,777,827
SILICONE RUBBER—ESTERIFIED SILICA COMPOSITION

Clinton M. Doede, Hamden, and Frederick L. Kilbourne, Jr., Woodmont, Conn., assignors to The Connecticut Hard Rubber Company, New Haven, Conn., a corporation of Connecticut No Drawing. Application June 17, 1952,
Serial No. 294,066

8 Claims. (Cl. 260—37)

This invention relates to the manufacture of silicone rubber and more particularly to a new silicone rubber product and a new method of making the same.

An object of the invention is to provide a silicone rubber product in which the silicone rubber polymer has better reinforcement than has been obtained heretofore, and which has better physical characteristics than heretofore.

Another object is to provide a simpler and better process of compounding and curing the rubber and of controlling the characteristics of the product, and to provide a process by which in a given case better and more certain results are accomplished in a relatively simple and convenient manner, with a saving of material.

A further object is to provide a silicone rubber product of which one component is a high-molecular-weight polysiloxane rubber which is essentially a dimethyl silicone polymer, another component being inorganic siliceous material in the form of very fine particles presenting a large surface area, said particles being separate and insulated from each other but intimately dispersed in the polysiloxane rubber and serving as the sole curative agent of the rubber compound.

Another purpose of the invention is to prevent the agglomeration of fine siliceous particles in the process of compounding the silicone rubber.

Another purpose of this invention is to cause the agglomeration by heating of the already thoroughly dispersed siliceous pigment particles.

Synthetic rubbers, to a greater degree than natural rubber, generally need pigment reinforcement to develop high tensile strength and/or abrasion resistance. The unreinforced silicone rubber possesses negligible strength, and any finely divided pigment will cause some degree of reinforcement. It is generally true that the smaller the diameter of the particles of the reinforcing powder, the greater will be the reinforcement value. Pigments such as described later on, having ultimate particles diameters of the order of 60 to 140 A., have exceptional reinforcing power in silicone rubbers.

Small particle size is not, however, the only criterion for good reinforcement of silicone rubber. For example, certain carbon blacks have particle diameters that go from 1000 A. down to as low as 200 A. These carbon blacks are quite effective for the reinforcement of natural rubber or GRS, but for some reason as yet unexplained, carbon blacks are not good reinforcing agents for silicone rubber.

It might be expected that finely divided silica would be a good reinforcing agent for silicone rubber due to the chemical similarity of the silica, which may be represented by the formula $SiO_2$, and the polysiloxane, which may be represented by the formula $((CH_3)_2SiO)_n$. The $CH_3$ group in the latter formula is sometimes replaced in part by other alkyl or aryl groups, but it is represented in this manner because in general the commercial silicone rubbers are derivatives of dimethyldichlorosilane. While not all forms of silica are found to be good reinforcing agents for silicone rubber, the expectation that silica-type pigments would be good reinforcing agents for silicone rubber has been realized in a number of cases. An example of this is a pigment known as a silica aerogel, and composed essentially of silica ($SiO_2$). Such a pigment is sold by Monsanto Chemical Company under the name "Santocel CS." Its method of preparation results in a high degree of porosity so that the surface area, including all of the pores of the pigment, is said to be in the neighborhood of 500 square meters per gram. The ultimate particles of "Santocel CS," as examined with the electron microscope, have a diameter of from 50 A. to 150 A. As used for the reinforcement of silicone rubber, the "Santocel CS" is in the form of aggregates of a size between 30,000 A. and 50,000 A., but, due to the high degree of porosity and large surface area, a high degree of reinforcement is provided.

It is well known that the rubber molecules in silicone rubber have a relatively low degree of affinity for one another. This is evidenced by the low freezing point of the rubber, the low tensile strength and elongation of the unreinforced rubber, and in other ways. Up to now "Santocel CS" has been one of the better pigments for reinforcing silicone rubber, indicating a great degree of affinity of silica particles for the rubber particles, and vice versa.

Other commonly used reinforcing pigments for silicone rubber, such as zinc oxide and titanium dioxide, are composed of smooth particles of average diameter of the order of 2,000 A. to 3,500 A. These do not show the degree of reinforcement obtained with "Santocel CS." Other pigments which have been used include hydrated aluminum oxide, which has an average particle diameter of 5,000 A., and calcium carbonate, which has an average particle diameter of 500 A.

When we speak of attractive forces between silica particles and rubber particles, we are in reality discussing the wetting of an inelastic solid, a silica particle, by a liquid. the silicone rubber. The forces of attraction between a liquid and a solid are related to the degree of wetting of the solid by the liquid. For example, if water is placed on a thoroughly cleaned sheet of glass, the water will spread out and completely cover the whole surface. In this case the liquid is said to wet the solid. The angle made at the edge of the liquid between the upper surface of the water and the glass is very nearly zero, implying complete wetting of a solid by the liquid. If, on the other hand, the glass has been exposed to even a minute amount of oil or dust in the atmosphere, it will be found that the water, instead of spreading on the glass, will remain in drops or globules at the edge of which the contact angle will be much greater than zero. A liquid which would be absolutely non-wetting would have a contact angle of 180°.

It is known that a liqued which thoroughly wets a solid is attracted by the solid with strong forces. On the other hand, a liquid which does not wet a solid is relatively easily removed from it. Thus when we speak of strong attractive forces between silica particles and silicone rubber we are in reality saying that the silicone rubber behaves as a liquid and thoroughly wets the silica particles with a contact angle approaching zero. Silica, such as "Santocel CS" or the new silica pigments to be described below, are examples of pigments which are thoroughly wet by the silicone rubber, while carbon black may be considered an example of a pigment which is not well wet by silicone rubber. The strong forces of wetting are readily observable in compositions containing a viscous liquid silicone rubber polymer of dimethyl silanol, and fine silica pigments such as "Santocel CS" or the new silica pigments described herein. The mixed compounds, even before curing or cross-linking, are stiff and elastic because of the large forces existing between the silica and the rubber.

In order to get a clearer picture of the magnitude of pigment particles, let us imagine a pigment particle of 2 centimeters diameter and then imagine that it is subdivided repeatedly in steps in which the diameter of the particles is subdivided ten times in each step. Thus the initial radius is 1 centimeter, the radius after the first subdivision is 0.1 centimeter, etc. If this is done eight times the pigment particles will have the radii shown in column 1 of the following table. In this calculation the total volume of the pigment is held constant. In column 2 of the table the number of particles of each size is calculated, and in column 3 the total area possessed by all the particles of each size is shown.

TABLE I

[Let diameter = 2 cm.]

| Particle Radius (r) | Number Spheres | Total Area | R [1] | Distance between Particles $2(R-r)$ |
|---|---|---|---|---|
| cm. | | sq. cm. | | cm. |
| 1 | 1 | $4\pi$ | 1.2 | .4 |
| .1 | $10^3$ | $4\pi \times 10$ | .12 | .04 |
| .01 | $10^6$ | $4\pi \times 100$ | .012 | .004 |
| .001 | $10^9$ | $4\pi \times 1{,}000$ | .0012 | .0004 |
| .0001 | $10^{12}$ | $4\pi \times 10^4$ | .00012 | .00004 |
| .00001 | $10^{15}$ | $4\pi \times 10^5$ | .000012 | .000004 |
| .000001 | $10^{18}$ | $4\pi \times 10^6$ | .0000012 | .0000004 |
| .0000001 | $10^{21}$ | $4\pi \times 10^7$ | .00000012 | .00000004 |

[1] Radius of sphere available for each particle.

The enormous increase in area between the pigment and the surrounding rubber is seen from column 3. Even when the forces per unit area between pigment and rubber are only moderate (poor wetting), there is necessarily a large increase in reinforcement because of the large area involved. When the forces are large, as seems to be the case with silica, the effect of the large area for extremely small particles is even more evident.

Let it now be further assumed that all of the pigment is enclosed within a given volume. It is convenient to assume an initial volume surrounding the pigment equal to that of a sphere of 1.2 centimeters radius. If this is done, it may be calculated, as shown in column 5, that the average distance between pigment particles becomes smaller and smaller.

In order to bring about an intimate dispersion of the pigment in the silicone polymer, we prefer to employ a pigment in which the particle has a radius not greatly in excess of 50 A., or 0.0000005 centimeter, which is between the particle sizes shown in lines 7 and 8 of the foregoing table. Thus the average distance between particles lies between 0.0000004 and 0.00000004 centimeter, or between 40 and 4 A.

If, however, as in the present case, the rubber medium in which these particles are to be dispersed is a semi-liquid silicone rubber, we have discovered that, since the particles are so fine and have a highly active surface, it is highly desirable to insulate the particles from each other so as to prevent or inhibit the formation of agglomerates or chains of pigment particles. Ordinarily this agglomeration or chain formation could occur before or during the mixing of the pigment with the rubber. To avoid this, we use a pigment which bears an organic coating firmly attached to the pigment.

A suitable pigment for these purposes is manufactured by E. I. duPont de Nemours & Co., and is commercially available under the general designation "GS Hydrophobic Silica," and the more specific designation "GS199S." This is an amorphous silica with ultimate particles of silica which are non-porous and have a diameter in the range of 60 to 120 A. These particles are aggregated together in groups. The aggregates are fairly open so that pores between particles may be penetrated by nitrogen gas, for example. The average pore diameter is at least 40 A. The aggregates show a combined surface area including the pores greater than one square meter per gram, but preferably from 250 to 400 square meters per gram. On part of the surface of the aggregates of ultimately smooth silica particles there is chemically combined a surface coating of —OR groups in which R is a butyl radical. The preferred structure of the —OR groups is such that the carbon atom attached to oxygen is also attached to at least one hydrogen, each —OR group having no more than 18 carbon atoms. Groups of this type are commonly referred to as estersils. It is preferred to have the R group a normally butyl radical. This pigment may be prepared as shown in the following example:

PREPARATION OF PIGMENT—EXAMPLE I

One volume of a solution of 0.48 N sulfuric acid is added at a uniform rate, over a period of 30 minutes, at a temperature of about 30° C., to three volumes of a solution of sodium silicate, containing 2 percent $SiO_2$ and having a molar $SiO_2:Na_2O$ ratio of 3.36. The amount of sulfuric acid solution is adjusted so that it is equivalent to 80 percent of the $Na_2O$ in the original sodium silicate. The pH during this process drops from 11.3 to about 9. Violent agitation is provided to insure complete and instantaneous mixing. The temperature during the entire reaction is maintained below 40° C. The clear sol resulting from this process step and containing 1.5 percent $SiO_2$, is called the "heel."

The heel is heated to 95° C. Solutions of sodium silicate and sulfuric acid are added simultaneously at a uniform rate over a period of two hours. The sodium silicate solution contains 10 percent $SiO_2$ and has a molar $SiO_2:Na_2O$ ratio of 3.36. Enough 4 percent sulfuric acid solution (approximately equal in volume to the sodium silicate solution) is added so that 80 percent of the $Na_2O$ in the silicate solution is neutralized during the addition step. The addition of silicate and acid is continued until one part of $SiO_2$ has been added for each part of $SiO_2$ present in the heel. During the additions the pH of the heel slowly rises from 9 to 10 and is then maintained at about 10. Vigorous agitation is employed so that the mixing is essentially instantaneous. A silica precipitate is thus obtained.

A 2 percent solution of a mixture of cetyl and lauryl trimethylammonium bromide, 0.16 percent of the mixed compounds is added, based on the weight of the silica. The slurry is filtered and the wet filter cake reslurried in water. The reslurry is adjusted to about pH 7 with dilute sulfuric acid, and then filtered and the filter cake washed with water.

This filter cake as obtained on a vacuum filter contains about 12.5 percent by weight of $SiO_2$. The specific surface area of the siliceous substrate of a number of batches thus prepared and reduced to powdered form by drying in air at 120° C. ranges from about 250 to 365 $M^2/g$. and averages about 300 $M^2/g$.

This wet filter cake is washed with tertiary butyl alcohol on a filter to remove the water. It is then washed with normal butyl alcohol on the filter to remove the tertiary butyl alcohol.

The filter cake which is wet with normal butyl alcohol is then slurried with an equal weight of anhydrous normal butyl alcohol and placed in a still with an 18 plate bubble-cap column operated with a reflux ratio of 10:1. Normal butyl alcohol is distilled slowly from the slurry over a period of 48 hours while maintaining the original volume of slurry in the still by the addition of anhydrous normal butyl alcohol. The volume of distillate removed during this period is twice the volume of the original slurry.

The final product is then filtered from the slurry and dried.

This produces a silica pigment in the form of an organophilic powder in a supercolloidal state of subdivision having an internal structure of inorganic amorphous silica, with a specific surface area of 250 to 400 $M^2/g$. and an average pore diameter of at least 40 A., in the form of aggregates of coherent ultimate non-porous spherical units of average diameter in the range of 60 to 120 A. (6 to 12 millimicrons), the internal structure having chemically bound to it —OR groups where R is a normal butyl radical.

PREPARATION OF PIGMENT—EXAMPLE II

Another suitable pigment was produced by the following procedure:

100 parts (0.58 mols.) of silicon tetrachloride in 75 parts of anhydrous ether were added slowly, with vigorous stirring, to a cooled (—5° C.) mixture consisting of 15.85 parts (0.884 mols.) of water in 150 parts of an inert solvent, anhydrous ether. To the resulting mixture 100 parts (1.35 mols.) of n-butyl alcohol were added and the mixture was heated. This produced a pigment the aggregates of which were relatively coarse in comparison to the product of the next preceding example, but the internal structure of inorganic siliceous material had a specific surface area of 100 square meters per gram, and there were chemically bound to the internal structure —OR groups wherein R is a hydrocarbon radical, wherein the carbon atom attached to oxygen is also attached to at least one hydrogen, and where each —OR group has no more than 18 carbon atoms.

This pigment, when used in compounding silicone rubber as hereinafter described, began to lose its organic coating at temperatures between 300° and 400° F., and formed an elastic volcanizate.

In connection with the procedure employed in the manufacture of rubber products in which the rubber mixture or compound contains intimately mixed silicone polymer and the fine-particle hydrophobic silica—in this case duPont "GS199S"—the following examples are given:

EXAMPLE A 100 volumes of dimethyl silicone rubber (General Electric SE–76 in this case) was placed on an open mill and 15 volumes of hydrophobic silica (dupont "GS199S") were thoroughly incorporated in the rubber. The mixed compound was pressed in a mold under a pressure of approximately 400 lbs. per square inch, and heated until the temperature in the mold reached 230° F., and was then held at this temperature for 15 minutes. After this heating, the mold was cooled to 150° F. and opened. The slab of partially cured rubber was removed and heated in a circulating-air oven for one hour at 300° F. The resulting product was found to have a tensile strength of 1025 lbs. per square inch, an ultimate elongation of 1150 percent, and a Shore Hardness of 37.

EXAMPLE B

Another slab of rubber was prepared by the same procedure as in Example A, with the exception that the rubber was given an oven cure of 24 hours at 300° F. As a result of this treatment, the tensile had increased to 1660, the ultimate elongation had decreased to 913 percent, and the Shore Hardness was 53.

EXAMPLE C

Another mixture of silicone rubber and pigment was prepared as in Example A, but in this case 2 percent of benzoyl peroxide, based on the weight of the rubber, was added to the mixture, this addition being made after the silica had been thoroughly incorporated in the rubber. The mixture was then placed under pressure in a mold and heated, and then given an oven cure of one hour at 300° F., as in Example A. The resulting product was found to have a tensile strength of 1008, an elongation of 525 percent, and a Shore Hardness of 61. Comparing these results with those of Example A, it will be seen that this rubber was stiffer and harder, indicating that the benzoyl peroxide enhanced the cure.

EXAMPLE D

A slab prepared in the manner of Example C was further cured by heating for a total period of 24 hours at 300° F. As a result, the tensile strength was decreased to 782, the elongation to 313 percent, and the Shore Hardness had increased to 69. This shows that in this case, as shown by the lowered elongation and tensile, there was an over-curing effect. However, for certain purposes such an over-cured condition might be desirable, for example in making a gasket designed to function at a temperature of from 200° to 300° F.

EXAMPLE E 100 volumes of dimethyl silicone rubber was mixed with 15 volumes of duPont "GS199S" silica and then with increasing volumes of a filler, viz., a diatomaceous earth called "Celite Superfloss." Celite Superfloss is a flux-calcined fine particle type of diatomaceous earth marketed by Johns-Manville Sales Corporation and commonly employed in the manufacture of silicone rubber. The curing periods were as follows: Mold (press) cure, 15 minutes at 230° F., and oven cure, 16 hours at 400° F. The "GS199S" was the only curing agent used. Tests showed the following results:

(1) "GS199S" 15 volumes, "Celite Superfloss" zero volumes, tensile strength 1376 p. s. i., elongation 713, hardness 58.

(2) "GS199S" Silica 15 volumes, "Celite Superfloss" 5 volumes, tensile strength 845 p. s. i., elongation 563 percent, and hardness 57.

(3) "GS199S" Silica 15 volumes, "Celite Superfloss" 10 volumes, tensile strength 813 p. s. i., elongation 463 percent, hardness 61.

EXAMPLE F

Here 2 percent of benzoyl peroxide based on the weight of the rubber was used as a curative in addition to the "GS199S" silica, other conditions being as in Example E. The results were:

(1) "GS199S" Silica 15 volumes, "Celite Superfloss" 5 volumes, tensile strength 900 p. s. i., elongation 225 percent, hardness 71.

(2) "GS199S" Silica 15 volumes, "Celite Superfloss" 10 volumes, tensile 910, elongation 200 percent, hardness 77.

(3) With further increase in the volumes of "Celite Superfloss," the tensile strength and elongation dropped and the hardness increased.

In these examples the silicone rubber was dimethyl silicone rubber manufactured by The General Electric Company under the designation "SE–76." This particular rubber is polymerized with sodium hydroxide as a catalyst. The molecular weight is approximately 1,000,000. This rubber was formerly known under the designation "GE 81176."

The mixing was accomplished in the usual manner on the customary open mill, but other customary milling procedures can be used.

It is to be noted that in Examples A and B the components of the compound or mixture are the polymer and the hydrophobic silica, there being no special curing agent or vulcanizing agent such as commonly employed due to the fact that, when the said two components are brought into intimate mixture, the silica itself acts as a curative or vulcanizer.

In the process of bringing about an intimate mixture of the polymer and the pigment particles, the coating of n-butyl alcohol or equivalent coating carried by each pigment particle acts, as above indicated, to provide insulation between each silica particle and the adjacent particle. This coating serves at least four different purposes:

(1) It insulates each silica particle from the adjacent ones during the mixing operation, and thus enables the pigment to be dispersed completely or substantially completely in the rubber without forming agglomerates.

(2) It prevents the silica particles from coalescing and forming chains or aggregates in the rubber, until the coating has been dislodged or removed by the rubber or otherwise in a heating or curing process.

(3) In addition, it increases the wetting of the silica particles by the silicone rubber by increasing the forces of attraction between the silicone rubber and the organic coating on the pigment.

(4) The coating, being chemically combined with the pigment, conceals a powerful vulcanizing capability until it is removed by heating, which causes the coating to vaporize and disappear.

The presence of the coating makes it possible to incorporate higher loading of pigment in silicone rubber than would ordinarily be possible, thus increasing the strength and other characteristics of the product. Furthermore, the coating, which is easily wet by the rubber, permits the ultimate degree of dispersion of the pigment in the rubber.

Although it is not as yet possible to explain exactly what occurs when the fine hydrophobic silica with its organophilic coating is incorporated in silicone rubber, a very unusual result has been observed in that the pigment causes vulcanization of the rubber even though no conventional vulcanizing agent is added to the mixture. The degree of strength enhancement attained by the use of the pigment is far beyond that usually attained by pigments heretofore used. It appears that after thorough heating of the silicone rubber-hydrophobic silica mixture, forces are set up within the rubber which are stronger than those normally obtained by vulcanization of the rubber with organic oxidizing agents such as benzoyl peroxide. Thus the particles of hydrophobic silica pigment are capable of setting up forces between the rubber molecules and themselves, or among themselves alone, said forces being greater than those ordinarily produced by chemical reaction of two separate rubber molecules with benzoyl peroxide to form a chemical cross-link. We find also that the closer the pigment particles are to one another, as caused by the increasing pigment concentration possible in this procedure, and the more active the surfaces of the particles become as and when the coating is removed under the effect of the heat employed in curing, the greater is the degree of cure or vulcanization. We believe that the extraordinary reinforcement that is obtained by using the silica and the rubber alone as components of the compound, is accounted for in some measure by, first, the extremely high degree of dispersion of the pigment, second, the closeness of the pigment particles to each other, third, the extremely large area of the pigment-rubber interface, and, fourth, because the silica particles, individually and en masse, are well wet by the rubber.

ties in all respects similar, but superior to, those of ordinary vulcanized silicone rubber.

Ordinary vulcanizable compositions undergo a thermosetting operation at a certain critical temperature which depends upon the critical temperature at which the vulcanizing ingredients undergo reaction first among themselves and eventually with the elastomer, setting up cross-links or chemical bonds between the molecules of the elastomer. In our compounds, vulcanization may be caused by physical forces occurring between silicone molecules and the surfaces of the finely divided particles of silica or it may be caused by some as yet unknown chemical reaction. The cross-links may also be formed between the chemically active silica particles, after the coating has been removed, each particle being firmly embedded in the rubber by physical forces such as those of wetting. In any case, these forces can be controlled by the specific surface characteristics of the silica particles which are subject to change at elevated temperatures. Thus, the rate of thermosetting of the composition of the rubber and herein described pigment may be controlled either by adjusting the proportion of surface active pigment or by controlling the degree of heating the mixture receives, or by both. The degree of heating refers to the temperature employed and also the time to which the composition is exposed to the heat.

The hardness and strength of the product is also affected by the nature of the silicon rubber or silicone oils employed. By varying these conditions there can be obtained almost any desired combination of fluidity or plasticity before heating, with elasticity or rigidity after heat treatment. For example, by replacing a part of the rubber with a lower molecular weight silicone oil and adding a smaller portion of surface active pigment, a semi-fluid composition that will flow before it is heated is obtained. This composition can then be set to an elastic rubbery solid by moderate heating. On the other hand, if a rubbery polymer is employed and a relatively high proportion of the active pigment is incorporated therein and the resulting mixture is cured by heat, there is obtained a stiff, flexible mica-like product that is more or less hard depending on the ultimate degree of heating (time and temperature) that removes the protective coating from the pigment particles and exposes the active surface to the rubber.

In connection with Examples A and B, Table II, which follows, is of interest as showing the superior reinforce-

TABLE II

*Compounds omitting a curing agent*

| Pigment | Vol. Pig. per 100 Vols. Rubber | Particle Diameter A | Time of cure, hours | Temp. of cures, °F. | Tensile Strength, p. s. i. | Elong., Percent | Hardness Shore A | Compression set 22 hrs. @ 300° F. |
|---|---|---|---|---|---|---|---|---|
| "GS199S" | 15 | 60–140 | 1 | 300 | 1,025 | 1,150 | 37 | |
|  | 15 |  | 24 | 300 | 1,660 | 913 | 53 | 78.5 |
|  | 15 |  | 24 | 400 | 1,160 | 638 | 63 | 40.0 |
|  | 25 |  | 1 | 300 | 1,245 | 1,000 | 62 | 97.2 |
|  | 25 |  | 24 | 300 | 1,720 | 775 | 70 | 91.0 |
|  | 25 |  | 24 | 400 | 897 | 275 | 89 | 65.4 |
| Silica Aerogel "Santocel CS" | 15 | 50–150 | 1 | 300 | No cure (tensile below 100 p. s. i.) | | | |
|  | 20 |  | 1 | 300 | 100 | 100 | 33 | |
|  | 20 |  | 24 | 400 | 286 | 225 | 67 | |

The explanation of this phenomenon is not exactly known. It is, however, obvious that two things are happening: (1) with ultimate particles of diameters of approximately 100 A, such as exhibited by "Santocel CS" or the new silica pigments disclosed herein, the distances between particles necessarily are of the order of 100 A or smaller, as shown in Table I, and (2) the interfacial area between the pigments and the rubber becomes very large, in this case of the order of $10^6$ square centimeters per gram of pigment.

When this cure or vulcanization occurs, the product becomes insoluble in organic solvents, it exhibits qualiment obtained in this case with "GS199S" as a pigment without the use of a specific curing agent.

Santocel CS is a commonly recognized form of silica gel also termed an Aerogel produced by conventional methods.

It will be noted that in this table the first batch corresponds to Example A and the second to Example B, in both of which 15 volumes of pigment are used with 100 volumes of the rubber. The third batch employs the same proportions, but in that case the heating (in the oven) was at a temperature of 400° F. rather than a temperature of 300° F. In the next three batches or examples in the table the volume of the pigment was increased to 25. The unusually good results obtained with the "GS199S" are apparent from the figures given for tensile strength, elongation, hardness and compression set.

In this table the results obtained with the "GS199S" are compared with those obtained with one loading of 15 volumes of "Santocel CS" and 2 loadings of 20 volumes of "Santocel CS," under the same conditions.

It is apparent from the table that, as respects the "GS199S" pigment, when using a loading of 15 or 25 volumes of the pigment per 100 of rubber, a satisfactory cure is obtained without the use of any vulcanizing agent, the 25 percent loading being superior to the 15. Under these same conditions, however, when the "Santocel CS" was used no cure of the silicone rubber was obtained with a 15 percent loading, and only a very slight degree of cure obtained with the 20. The results shown demonstrate that, when the extremely fine hydrophobic silica is well dispersed in a silicone rubber mix and heated, it performs a function far beyond any reinforcing function that has been realized previously, because the surface character of the pigment enables it to be dispersed completely even when high proportions of the pigment are used, and because the silica performs a function in the nature of a vulcanizing function that has hitherto been unknown. This may be a physical vulcanization as distinct from the usual chemical vulcanization, or it may be a chemical combination of the active silica surface with the silicone molecules by some mechanism as yet unknown, but whatever the explanation the product has the superior properties shown by the table, and this is brought about by a simple operation of mixing and heating two components, making a third component (curing agent) unnecessary.

The procedure described makes it possible to cure silicone rubber thoroughly without producing low-stretch, resinous products. Long cures are desirable in silicone rubber compounding in order to stabilize the product and obtain low compression set properties. It is also possible to obtain a better control of the vulcanization. Moreover, the use of this process, as indicated by way of example in Examples A and B, and in Table II, makes it possible to eliminate the use of a hazardous material (benzoyl peroxide or similar material) from factories and storage rooms. Another advantage is that compounds produced in this manner do not contain residual benzoic acid or like acid which is a depolymerizing agent for the vulcanized silicone product. A further improvement arising from this process is that the vulcanizing action is not stopped or retarded by the presence in the mixture of such substances as aluminum oxide, titanium dioxide, or carbon black, which have been found to inhibit or even prevent the action of benzoyl peroxide as a curative for silicone rubber. When used in sufficient quantities, the hydrophobic silica will cause useful vulcanization to occur in the presence of these pigments, even though cure cannot be obtained in their presence by using benzoyl peroxide in normal amount. In fact, when sufficient pigment is present to contact a large proportion of the rubber molecules—10 volumes per 100 of rubber is the practical minimum—our experience shows that a cure is obtained regardless of the presence of other types of pigment in the mixture.

It has been noted that the pigment of Example II is one in which the aggregates are relatively coarse in comparison to the pigment of Example I. However, the Example II pigment, when ground and compounded with silicone rubbers by procedures similar to those of Examples A and B, brought about a satisfactory cure in the absence of any other curing agent.

With regard to Examples C and D, where a small percentage of benzoyl peroxide was used as a third component of the compound, it is noted that the best results are secured by making the addition of the curing agent only after the silica has been thoroughly incorporated in the rubber. In Example C the resulting product was stiffer and harder than in the case of Example A, indicating that the benzoyl peroxide enhanced the cure. On the other hand there was a decrease in tensile strength. In Example D there was produced an over-cured effect, although the material produced could be used for one or more purposes as indicated in the example.

Examples E and F show the use of a filling material which in this instance is diatomaceous earth, in a composition with the "GS199S" silica and the silicone rubber, and in the case of Example F benzoyl peroxide as an additional curative. These compositions are given by way of example only, and it is to be understood that numerous substances are suitable for use as filling material. Suitable filling materials will suggest themselves to those skilled in the art. It is indicated herein, however, that such pigments as aluminum oxide, carbon black, and titanium dioxide should not be used as fillers or pigments in compositions in which the benzoyl peroxide is employed as a curing agent, for the reason that these materials have been found to inhibit or prevent the action of benzoyl peroxide as a curative. While in the examples given in Tables II and III a single reinforcing agent was used, for the purpose of clarifying the effects in respect to physical characteristics, the use of additional substances having one or more functions in the compounds, where the additional material is inert or is entirely compatible with the other ingredients, is envisaged, and except as shown by the context there is no limitation to compositions containing the organophilic silica pigment only. Unless otherwise indicated in the context, the term "filling material" is used in a broad and general sense.

In connection with the employment of a curing agent, e. g., benzoyl peroxide, as an additive, reference is made to the following table showing the results secured in compounding different batches of silicone rubber by a procedure similar to Examples C and D, using 100 parts of the silicone polymer, 2 parts of benzoyl peroxide based on

TABLE III

*Compounds containing a curing agent*

| Pigment | Vol. Pig. loading per 100 Vols. of Rubber | Average Particle Diameter A | Time of Heating, hr. | Temp. of Heating, ° F. | Tensile Strength, p. s. i. | Elong., Percent | Hardness Shore A |
| --- | --- | --- | --- | --- | --- | --- | --- |
| Zinc Oxide | 50 | 2,000 | 1 | 300 | 408 | 550 | 56 |
| Titanium Dioxide | 40 | 3,500 | 1 | 300 | 587 | 408 | 46 |
| Silica Aerogel "Santocel CS" | 20 | ¹ 50-150 | 1 | 300 | 887 | 308 | 61 |
| Hydrated Aluminum Oxide | 40 | 5,000 | 1 | 300 | 217 | 917 | 32 |
| Calcium Carbonate | 40 | 500 | 1 | 300 | 260 | 888 | 36 |
| "GS199S" | 15 | ¹ 60-140 | 1 | 300 | 1,008 | 525 | 61 |
| "GS199S" | 25 | ¹ 60-140 | 1 | 300 | 1,615 | 613 | 77 |
| "GS199S" | 35 | ¹ 60-140 | 1 | 300 | 1,490 | 663 | 86 |

¹ These are ultimate particle diameters as seen with the electron microscope. The ultimate particles are present as aggregates which may be as large as 50,000 A. in the case of "Santocel CS" or more than 1500 A. in the case of "GS199S". Since the aggregates are porous, the ultimate particle diameter is the important figure.

the polymer, and different pigments as shown in the table. The pigments used were zinc oxide, titanium dioxide, silica aerogel, hydrated aluminum oxide, calcium carbonate, and "GS199S," and, as will be noted, the table shows the tensile strength, elongation, and hardness of the resulting cured products.

It will be noted that three different loadings of the fine hydrophobic silica are given, the first being 15 volumes, the second 25 volumes, and the third 35 volumes per 100 of rubber. The silicone rubber was, as before, General Electric "SE-76." The results show very clearly the greatly improved physical properties of the product where the fine hydrophobic silica was used. The smallest loading of the "GS199S" (15 volumes) gave a tensile of 1008, an elongation of 525, and a Shore Hardness of 61. The second loading of "GS199S" (25 volumes) produced a tensile of 1615, an elongation of 613, and a Shore Hardness of 77. It is hardly necessary to comment on the improvement over the comparative compounds, of which the silica aerogel was the best.

In producing all of these compounds, the time of heating was one hour and the temperature 300° F. With this heating period and temperature the surface characteristics of the pigment change only to a slight degree. However, with further heating than is shown in this table, the molded products containing "GS199S," which are apparently already cured with benzoyl peroxide, begin to show also vulcanization by the physical or chemical forces of attraction of the fine particles of hydrophobic silica, as a result of which the products become stiffer, harder, and stronger. While it has been said above that the use of benzoyl peroxide as an additive enhances the cure, in comparison to a product containing only silica and silicone polymer, it may also be said that the fine hydrophobic silica enhances the cure obtained by the employment of benzoyl peroxide or like curing agent in the compounding of silicone rubber.

The effect of the further heating referred to in the next preceding paragraph is shown by the following example:

EXAMPLE G

A recipe containing 25 volumes of "GS199S" silica pigment and 2 percent of benzoyl peroxide based on the weight of the dimethyl silicone rubber, had the following properties when cured in an oven for 1 hour at 300° F. (following press cure of 15 minutes at 230° F.): tensile strength 1615 p. s. i., elongation 613 percent, hardness 77; tensile strength at 200 percent elongation 419 p. s. i. The same recipe, when cured for 24 hours at 320° F., had the following properties: tensile strength 1170 p. s. i., elongation 388 percent, hardness 85; tensile strength at 200 percent elongation 684 p. s. i.

It is obvious from the above figures that the hardness has increased from 77 to 85. The increase in the tensile strength at 200 percent elongation shows that the longer curing makes the slab stiffer and stronger. The fact that the ultimate tensile strength and ultimate elongation were reduced by the additional curing is an indication of over-curing. Over-curing is sometimes resorted to in practice in order to improve some characteristic other than tensile strength and elongation, as, in this example, the tensile strength at 200 percent elongation. The resistance to permanent set after compression is another property that is generally improved by over-curing. For example, by curing the above recipe 24 hours at 400° F. (a higher temperature), the compression set was 49 percent as compared with 94.5 percent for the original stock that was cured 1 hour at 300° F. Other data on the 24-hour cure at 400° F. were: tensile strength 795 p. s. i., elongation 75 percent, and hardness 93.

Another polymer, General Electric "SE-79" may be used in some cases although results are not a satisfactory as with "SE-76." The former is a dimethylsiloxane rubber believed to be of higher molecular weight than "SE-76" and polymerized in a different manner. It is probably slightly cross-linked.

In one example, 100 volumes of "SE-79" were compounded with 30 volumes of "GS199S." The resultant mix was cured in a mold under pressure for 15 minutes at 230° F., followed by an air cure in an oven at 400° for 16 hours, and developed the following properties: tensile 440 p. s. i., elongation 63 percent, and hardness 82.

In the curing of silicone rubbers it is usual to give the mixture preliminary heating in a mold of from 5 to 30 minutes at a temperature between 225° and 275° F. This is followed by heating in an oven for a period from one to 48 hours at a temperature between 300° and 480° F.

For producing the results contemplated by the present invention, there should be a heating of ten minutes or longer at a temperature of 230° F. or higher. In preparing a mixture where 100 volumes of siloxane polymer are used, the volume of pigment should be from 10 to 130 parts. Where benzoyl peroxide is used as a curing additive, it should be in the amount of 2 percent or less based on the weight of the polymer.

In place of benzoyl peroxide another member of the group consisting of benzoyl peroxide, diacyl peroxide, acetyl benzoyl peroxide, diacetyl peroxide, and tertiary butyl perbenzoate, may be used, such curative being in quantity as mentioned above. The curing agent used as an additive may be a suitable one commonly used in the manufacture of silicone rubber.

The products of the invention have in many cases high tensile strength and high elongation, as shown by the preceding tables. The tensile strength with the preferred polymer is at least 900 p. s. i., and more often at least 1,000 p. s. i., and the elongation is at least 200 percent. However, in the broader aspects of the invention we do not limit ourselves to these physical properties since there are many modifications of the recipes contained herein which might embody the principles of our invention but which might not result in physicals as shown above.

By the method described, polymeric siloxanes are rendered insoluble in organic liquids selected from the class comprising alcohols, ketones, aldehydes, hydrocarbons, phenols, ethers, and halogenated derivatives of the ethers.

There is a better reinforcement of the silicone rubber polymer than has been obtained heretofore, resulting in a notable improvement in the physical characteristics of the product. It is obvious, also, that the invention results in a very notable improvement in this art whereby vulcanization is accomplished through the use of the reinforcing pigment which here has an additional new function obviating the need of the usual curative agent.

It is obvious also that the invention provides a novel method of compounding silicone rubber products and of controlling their physical characteristics.

Various changes may be made in the ingredients of the compounds and their proportions and in the detailed procedure without departure from the principles of the invention or the scope of the claims.

What we claim is:

1. The method of making vulcanized silicone rubber which comprises preparing an intimate mixture including a high-molecular-weight polysiloxane rubber gum which is essentially a nonelastic dimethyl silicone polymer, and an organophilic powder in a supercolloidal state of subdivision having an internal structure of inorganic amorphous silica, with a specific surface area of 250 to 400 $M^2/g$. and an average pore diameter of at least 4 millimicrons, the internal structure having directly chemically bound to it —OR groups where R is a normal butyl radical, the organophilic solid being present in amounts sufficient to effect vulcanization of the rubber and being the sole curing agent, and heating said mixture for at least 10 minutes at a temperature of at least 230° F. to form a vulcanized product.

2. The method of making vulcanized silicone rubber which comprises preparing an intimate mixture including a high-molecular-weight polysiloxane rubber gum which is essentially a nonelastic dimethyl silicone polymer, and an organophilic powder in a supercolloidal state of subdivision having an internal structure of inorganic amorphous silica, with a specific surface area of 250 to 400 $M^2/g.$ and an average pore diameter of at least 4 millimicrons, the internal structure having directly chemically bound to it —OR groups where R is a normal butyl radical, the organophilic supercolloidal solid being present in an amount of from 10 to 50 volumes per 100 volumes of silicone rubber and being the sole curing agent, and heating said mixture for at least 10 minutes at a temperature of at least 230° F. to form a vulcanized product.

3. The method of making vulcanized silicone rubber which comprises preparing an intimate mixture including a high-molecular-weight polysiloxane rubber gum which is essentially a nonelastic dimethyl silicone polymer, and an organophilic powder in a supercolloidal state of subdivision having an internal structure of inorganic amorphous silica, with a specific surface area of 250 to 400 $M^2/g.$ and an average pore diameter of at least 4 millimicrons, the internal structure having directly chemically bound to it —OR groups where R is a normal butyl radical, the organophilic supercolloidal solid being present in an amount of from 10 to 35 volumes per 100 volumes of silicone rubber and being the sole curing agent, and heatinf said mixture for at least 10 minutes at a temperature of at least 230° F. to form a vulcanized product.

4. The method of making vulcanized silicone rubber which comprises preparing an intimate mixture including a high-molecular-weight polysiloxane rubber gum which is essentially a nonelastic dimethyl silicone polymer, and an organophilic powder in a supercolloidal state of subdivision having an internal structure of inorganic amorphous silica, with a specific surface area of 250 to 400 $M^2/g.$ and an average pore diameter of at least 4 millimicrons, the internal structure having directly chemically bound to it —OR groups where R is a normal butyl radical, the organophilic supercolloidal solid being present to effect a vulcanization of the rubber and being the sole curing agent, heating the mixture in a mold for a period of from 5 to 30 minutes at a temperature of between 225 and 275° F., and then heating the product in an oven for a period of from 1 to 48 hours at a temperature between 300 and 480° F.

5. A vulcanized silicone rubber product prepared by the method of claim 1.

6. A vulcanized silicone rubber product prepared by the method of claim 2.

7. A vulcanized silicone rubber product prepared by the method of claim 3.

8. A vulcanized silicone rubber product prepared by the method of claim 4.

References Cited in the file of this patent
UNITED STATES PATENTS

| | | |
|---|---|---|
| 2,404,426 | Bechtold et al. | July 23, 1946 |
| 2,541,137 | Warrick | Feb. 13, 1951 |
| 2,563,555 | Safford | Aug. 7, 1951 |
| 2,610,167 | Te Grotenhuis | Sept. 9, 1952 |
| 2,657,149 | Iler | Oct. 27, 1953 |

OTHER REFERENCES

Le Caoutchouc & La Gutta-Percha, November 15, 1938, page 315.